United States Patent
Liu (10) Patent No.: US 9,603,118 B2
(45) Date of Patent: Mar. 21, 2017

(54) METHOD AND DEVICE FOR DETERMINING NODE MOVEMENT

(71) Applicant: Huawei Technologies Co., Ltd., Shenzhen (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/043,741

(22) Filed: Feb. 15, 2016

(65) Prior Publication Data

US 2016/0165567 A1 Jun. 9, 2016

Related U.S. Application Data (63) Continuation of application No. PCT/CN2013/081562, filed on Aug. 15, 2013.

(51) Int. Cl.
*H04W 24/00* (2009.01)
*H04W 64/00* (2009.01)
*H04B 17/318* (2015.01)

(52) U.S. Cl.
CPC .......... *H04W 64/00* (2013.01); *H04B 17/318* (2015.01)

(58) Field of Classification Search
CPC ............................. H04B 17/318; H04W 64/00
(Continued)

(56) References Cited

U.S. PATENT DOCUMENTS 7,200,374 B1 * 4/2007 Stephens ........... H04W 72/1231
455/226.3
8,774,134 B2 * 7/2014 Raghothaman ....... H04W 36/30
370/332
(Continued)

FOREIGN PATENT DOCUMENTS

CN 101394325 A 3/2009
CN 101635880 A 1/2010
(Continued)

OTHER PUBLICATIONS

Ed, W.T., et al., "RPL: IPv6 Routing Protocol for Low-Power and Lossy Networks," Internet Engineering Task Force (IETF), Category: Standards Track, Mar. 2012, 157 pages.
(Continued)

*Primary Examiner* — Babar Sarwar
(74) *Attorney, Agent, or Firm* — Slater Matsil, LLP (57) ABSTRACT

Embodiments disclose a method and device for determining a node movement. The method includes: when a first node determines that the first node is currently in an abnormal state, broadcasting at least two RSSI request messages, and receiving signal strength measurement values that are returned by a second node and separately obtained by means of measurement for at least two RSSI request messages in the at least two RSSI request messages broadcast by the first node. The method also includes separately calculating at least two path loss values between the first node and the second node according to the at least two received signal strength measurement values; and determining that the first node moves when it is determined that a quantity of second nodes, of which at least two path loss values are all different, is greater than a set threshold.

15 Claims, 4 Drawing Sheets

(58) Field of Classification Search
USPC ............... 455/4.1, 412.1–414.2, 420–422.1, 455/435.1–453, 456.1, 456.2, 456.6, 457, 455/464, 509, 550.1; 370/328–332, 312, 370/341, 254
See application file for complete search history.

(56) References Cited

U.S. PATENT DOCUMENTS

| | | | |
|---|---|---|---|
| 2002/0055978 A1* | 5/2002 | Joon-Bo | H04W 84/20 709/209 |
| 2004/0132410 A1* | 7/2004 | Hundal | H04B 17/0085 455/67.13 |
| 2008/0299927 A1* | 12/2008 | Tenbrook | H04W 48/16 455/226.2 |
| 2009/0207748 A1* | 8/2009 | Choi | H04L 43/0811 370/252 |
| 2010/0330943 A1* | 12/2010 | Hoepfner | H04B 17/318 455/226.2 |
| 2011/0039517 A1* | 2/2011 | Wigren | G01S 5/0252 455/404.2 |
| 2011/0310770 A1* | 12/2011 | Liang | H04W 84/18 370/254 |
| 2012/0052864 A1* | 3/2012 | Swaminathan | H04W 36/0061 455/436 |
| 2012/0252432 A1* | 10/2012 | Henttonen | H04W 24/10 455/422.1 |
| 2012/0289163 A1* | 11/2012 | Fu | H04W 48/16 455/62 |
| 2014/0241198 A1* | 8/2014 | Sun | H04L 5/0048 370/252 |
| 2015/0005016 A1* | 1/2015 | Palanki | H04W 4/027 455/456.6 |

FOREIGN PATENT DOCUMENTS

| | | |
|---|---|---|
| CN | 101808345 A | 8/2010 |
| CN | 101827416 A | 9/2010 |
| CN | 102547791 A | 7/2012 |
| WO | 2007020907 A1 | 2/2007 |

OTHER PUBLICATIONS

Korbi, I.E., et al., "Mobility Enhanced RPL for Wireless Sensor Networks," Third International Conference on the Network of the Future, Nov. 21-23, 2012, 8 pages, Gammarth.

Lee, K. C., et al., "RPL Under Mobility," IEEE Consumer Communications and Networking Conference, Jan. 14-17, 2012, 4 pages, Las Vegas, NV.

Lee, K. C., et al., "A Comprehensive Evaluation of RPL Under Mobility," Hindawi Publishing Corporation, International Journal of Vehicular Technology, 2012, 10 pages, vol. 2012, Article ID 904308.

Safdar, V., et al., "A Hybrid Routing Protocol for Wireless Sensor Networks With Mobile Sinks," 7th Internationsl Symposium on Wireless and Pervasive Computing, Jul. 3-5, 2012, 5 pages, Dalian.

* cited by examiner

METHOD AND DEVICE FOR DETERMINING NODE MOVEMENT

This application is a continuation of International Application No. PCT/CN2013/081562, filed on Aug. 15, 2013, which is hereby incorporated by reference in its entirety

TECHNICAL FIELD

The present invention relates to the wireless communications field, and in particular, to a method and device for determining a node movement based on Internet Protocol version 6 IPv6.

BACKGROUND

Because an IPv6 (Internet Protocol Version 6) wireless sensor network has a limited computing capability and communications capability, the ROLL (Routing Over Low Power and Lossy Networks) working group of the IETF (Internet Engineering Task Force) has proposed, in RFC6550, an RPL (IPv6 Routing Protocol for Low-Power and Lossy Networks) routing mechanism that is applicable to the IPv6 wireless sensor network. However, this RPL routing mechanism is designed for a static IPv6 wireless sensor network, which cannot meet a requirement of the IPv6 wireless sensor network in a mobile scenario.

To ensure correct execution of the RPL routing mechanism in the mobile scenario, a problem of node mobility in the IPv6 wireless sensor network needs to be resolved. A document entitled *Mobility Enhanced RPL For Wireless Sensor Network* mentions that a dynamic DIS (Destination Oriented Directed Acyclic Graph Information Solicitation) management mechanism is designed to determine the problem of node mobility in the IPv6 wireless sensor network.

Specifically, in the dynamic DIS management mechanism, a sending period for sending a DIS message by a node is changed, and then a sending period for sending a DIO (Destination Oriented Directed Acyclic Graph Information Object) message as a reply by a neighboring node of the node is changed, so that a mobile node in the IPv6 wireless sensor network can update acyclic graph information in a timely manner according to an actual network status, so as to maintain a connection between the mobile node and a network topology.

When a node in the IPv6 wireless sensor network moves, a Rank value (that is, a value of a quantity of hops from the node to a convergence node of the IPv6 wireless sensor network, where the quantity of hops is counted as follows: one hop is counted if a node can directly communicate with another node instead of communicating with the another node through another node), an alternate parent node set, and a preferred parent node change. Therefore, a change of the preferred parent node of the node is directly used as an indication for determining that the node moves in the IPv6 wireless sensor network. That is, it is determined that a node moves as long as a preferred parent node of the node changes.

Figure 1:
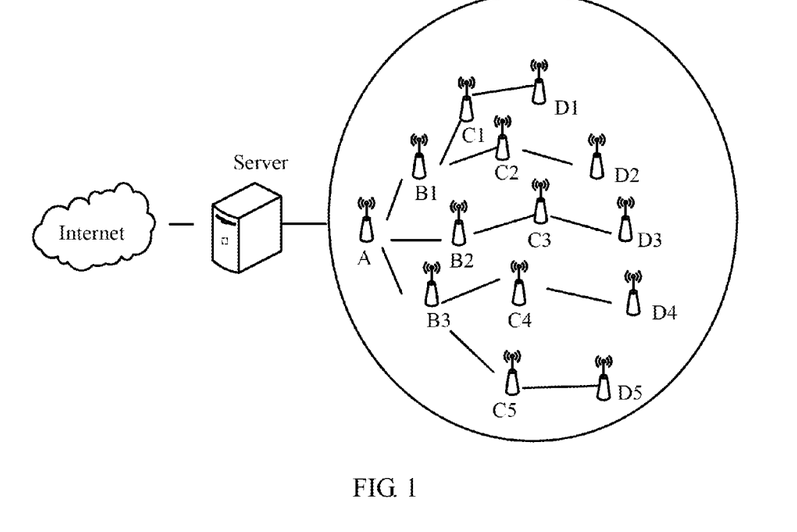
FIG. 1 is a schematic structural diagram of a network topology of an IPv6 wireless sensor network.

FIG. 1 is a schematic structural diagram of a network topology of an IPv6 wireless sensor network.

It can be seen from FIG. 1 that, a parent node A is connected to three child nodes: B1, B2 and B3; the node B1 is connected to two child nodes: C1 and C2; the node B2 is connected to one child node C3; B3 is connected to two child nodes: C4 and C5; the node C1 is connected to one child node D1; the node C2 is connected to one child node D2; the node C3 is connected to one child node D3; the node C4 is connected to one child node D4; C5 is connected to one child node D5. It is assumed that D5 is a movable node, a current preferred parent node of the node D5 is C5, and an alternate parent node set is {A, B1, B2, B3, C1, C2, C3, C4, D1, D2, D3 and D4}. According to the DIS management mechanism, when the preferred parent node C5 of the node D5 changes, it is determined that the node D5 moves. However, when the node C5 in the IPv6 wireless sensor network fails (or cannot work), to ensure connectivity of nodes in the network topology, the node D5 needs to choose a new preferred parent node, which means that the preferred parent node of the node D5 changes, but the node D5 may not move in this case. That is, a change of a preferred parent node cannot indicate that a node moves. In other words, it is quite inaccurate to determine that a node moves simply based on a change of a preferred parent node of the node.

In conclusion, a method for determining a node movement is in urgent need, to resolve a problem of low accuracy in determining a node movement in the prior art.

SUMMARY

Embodiments provide a method and device for determining a node movement, which are used to resolve a problem of low accuracy in determining a node movement in the prior art.

According to a first aspect, a method for determining a node movement is provided. The method includes, when a first node determines that the first node is currently in an abnormal state, broadcasting at least two received signal strength indication RSSI request messages, and receiving, by the first node, signal strength measurement values that are returned by a second node and separately obtained by means of measurement for at least two RSSI request messages in the at least two RSSI request messages broadcast by the first node. The method also includes separately calculating at least two path loss values between the first node and the second node according to the at least two received signal strength measurement values, and determining, by the first node, that the first node moves when it is determined that a quantity of second nodes, of which at least two path loss values are all different, is greater than a set threshold.

In possible implementation manners of the first aspect, in a first possible implementation manner, the broadcasting at least two RSSI request messages includes: successively broadcasting an RSSI request message for at least two times, where the RSSI request message is used to instruct a second node that receives the RSSI request message to measure signal strength of the RSSI request message and return a measurement result.

In the possible implementation manners of the first aspect or the first possible implementation manner of the first aspect, in a second possible implementation manner, the separately calculating at least two path loss values between the first node and the second node according to the at least two received signal strength measurement values includes: calculating one path loss value between the first node and the second node according to any signal strength measurement value in the at least two received signal strength measurement values and based on the signal strength measurement value and a transmit power value of an RSSI request message corresponding to the signal strength measurement value.

In the possible implementation manners of the first aspect, or the first possible implementation manner of the first aspect, or the second possible implementation manner of the first aspect, in a third possible implementation manner, the determining, by the first node, that the first node moves when it is determined that an obtained quantity of second nodes, of which at least two path loss values are all different, is greater than the set threshold includes: calculating, by the first node, a ratio of the quantity of second nodes of which at least two path loss values are all different to a total quantity of second nodes that return signal strength measurement values; and when the ratio obtained by means of calculation is greater than a set threshold, determining that the first node moves.

In the possible implementation manners of the first aspect, or the first possible implementation manner of the first aspect, or the second possible implementation manner of the first aspect, or the third possible implementation manner of the first aspect, in a fourth possible implementation manner, that a first node determines that the first node is currently in an abnormal state includes: when it is detected that a current Rank value changes, the first node determines that the first node is currently in the abnormal state; or when it is detected that a parent node set of the first node changes, the first node determines that the first node is currently in the abnormal state; or when it is detected that a preferred parent node of the first node changes, the first node determines that the first node is currently in the abnormal state.

According to a second aspect, a device for determining a node movement is provided. The device includes a broadcasting module, configured to: when it is determined that the device for determining a node movement is currently in an abnormal state, broadcast at least two received signal strength indication RSSI request messages; a receiving and calculating module, configured to: receive signal strength measurement values that are returned by a second node and separately obtained by means of measurement for at least two RSSI request messages in the at least two RSSI request messages broadcast by broadcasting module; and separately calculate at least two path loss values between a first node and the second node according to the at least two received signal strength measurement values. The device also includes a determining module, configured to: when it is determined that a quantity of second nodes, of which at least two path loss values that are obtained by the receiving and calculating module are all different, is greater than a set threshold, determine that the first node moves.

In possible implementation manners of the second aspect, in a first possible implementation manner, the broadcasting module is specifically configured to successively broadcast an RSSI request message for at least two times, where the RSSI request message is used to instruct a second node that receives the RSSI request message to measure signal strength of the RSSI request message and return a measurement result.

In the possible implementation manners of the second aspect or the first possible implementation manner of the second aspect, in a second possible implementation manner, the receiving and calculating module is specifically configured to calculate one path loss value between the first node and the second node according to any signal strength measurement value in the at least two received signal strength measurement values and based on the signal strength measurement value and a transmit power value of an RSSI request message corresponding to the signal strength measurement value.

In the possible implementation manners of the second aspect, or the first possible implementation manner of the second aspect, or the second possible implementation manner of the second aspect, in a third possible implementation manner, the determining module is specifically configured to: calculate a ratio of the quantity of second nodes of which at least two path loss values are all different to a total quantity of second nodes that return signal strength measurement values; and when the ratio obtained by means of calculation is greater than a set threshold, determine that the first node moves.

In the possible implementation manners of the second aspect, or the first possible implementation manner of the second aspect, or the second possible implementation manner of the second aspect, or the third possible implementation manner of the second aspect, in a fourth possible implementation manner, the broadcasting module is specifically configured to: when it is detected that a current Rank value changes, determine that the device is currently in the abnormal state; or when it is detected that a parent node set of the device changes, determine that the device is currently in the abnormal state; or when it is detected that a preferred parent node of the device changes, determine that the device is currently in the abnormal state.

According to a third aspect of the present invention, a node device is provided. The device includes a signal transmitter, configured to: when it is determined that the node device is currently in an abnormal state, broadcast at least two received signal strength indication RSSI request messages; and a processor, configured to: receive signal strength measurement values that are returned by a second node and separately obtained by means of measurement for at least two RSSI request messages in the at least two RSSI request messages broadcast by a first node; separately calculate at least two path loss values between the first node and the second node according to the at least two received signal strength measurement values; and when it is determined that a quantity of second nodes, of which at least two path loss values are all different, is greater than a set threshold, determine that the first node moves.

In possible implementation manners of the third aspect, in a first possible implementation manner of the third aspect, the signal transmitter is specifically configured to successively broadcast an RSSI request message for at least two times, where the RSSI request message is used to instruct a second node that receives the RSSI request message to measure signal strength of the RSSI request message and return a measurement result.

In the possible implementation manners of the third aspect or the first possible implementation manner of the third aspect, in a second possible implementation manner, the processor is specifically configured to calculate one path loss value between the first node and the second node according to any signal strength measurement value in the at least two received signal strength measurement values and based on the signal strength measurement value and a transmit power value of an RSSI request message corresponding to the signal strength measurement value.

In the possible implementation manners of the third aspect, or the first possible implementation manner of the third aspect, or the second possible implementation manner of the third aspect, in a third possible implementation manner, the processor is specifically configured to: calculate a ratio of the quantity of second nodes of which at least two path loss values are all different to a total quantity of second nodes that return signal strength measurement values; and when the ratio obtained by means of calculation is greater than a set threshold, determine that the first node moves.

In the possible implementation manners of the third aspect, or the first possible implementation manner of the third aspect, or the second possible implementation manner of the third aspect, or the third possible implementation manner of the third aspect, in a fourth possible implementation manner, the signal transmitter is specifically configured to: when it is detected that a current Rank value changes, determine that the node device is currently in the abnormal state; or when it is detected that a parent node set of the node device changes, determine that the node device is currently in the abnormal state; or when it is detected that a preferred parent node of the node device changes, determine that the node device is currently in the abnormal state.

Beneficial effects of the present invention are as follows.

According to the embodiments, when it is determined that a first node is currently in an abnormal state, the first node broadcasts at least two RSSI request messages, receives signal strength measurement values that are returned by a second node and separately obtained by means of measurement for at least two RSSI request messages in the at least two RSSI request messages broadcast by the first node, separately calculates at least two path loss values between the first node and the second node according to the at least two received signal strength measurement values, and when it is determined that a quantity of second nodes, of which at least two path loss values are all different, is greater than a set threshold, determines that the first node moves. In this way, that a node becomes abnormal is no longer the only condition for determining that the node moves. Instead, when the node detects that the node is in an abnormal state, it is further determined quality of a signal for communication between the node and an adjacent node of the node. Whether the node actually moves can be accurately determined in a timely manner by using a change in the quality of a signal for communication between the node and the adjacent node of the node. Therefore, accuracy of determining a node movement is improved.

DETAILED DESCRIPTION OF ILLUSTRATIVE EMBODIMENTS

To implement objects of the present invention, embodiments provide a method and device for determining a node movement. When it is determined that a first node is currently in an abnormal state, the first node broadcasts at least two RSSI request messages, receives signal strength measurement values that are returned by a second node and separately obtained by means of measurement for at least two RSSI request messages in the at least two RSSI request messages broadcast by the first node, separately calculates at least two path loss values between the first node and the second node according to the at least two received signal strength measurement values, and when it is determined that a quantity of second nodes, of which at least two path loss values are all different, is greater than a set threshold, determines that the first node moves.

In this way, that a node becomes abnormal is no longer the only condition for determining that the node moves. Instead, when the node detects that the node is in an abnormal state, it is further determined quality of a signal for communication between the node and an adjacent node of the node. Whether a node actually moves can be accurately determined in a timely manner by using a change in the quality of a signal for communication between the node and the adjacent node of the node. Therefore, accuracy of determining a node movement is improved.

It should be noted that the embodiments are applied to a network system architecture that has a directed acyclic graph topology structure, for example, an IPv6 network, so as to determine a status of a node in a timely manner and maintain better connectivity of a network topology.

The following describes the embodiments in detail with reference to accompanying drawings in this specification.

Embodiment 1

Figure 2:
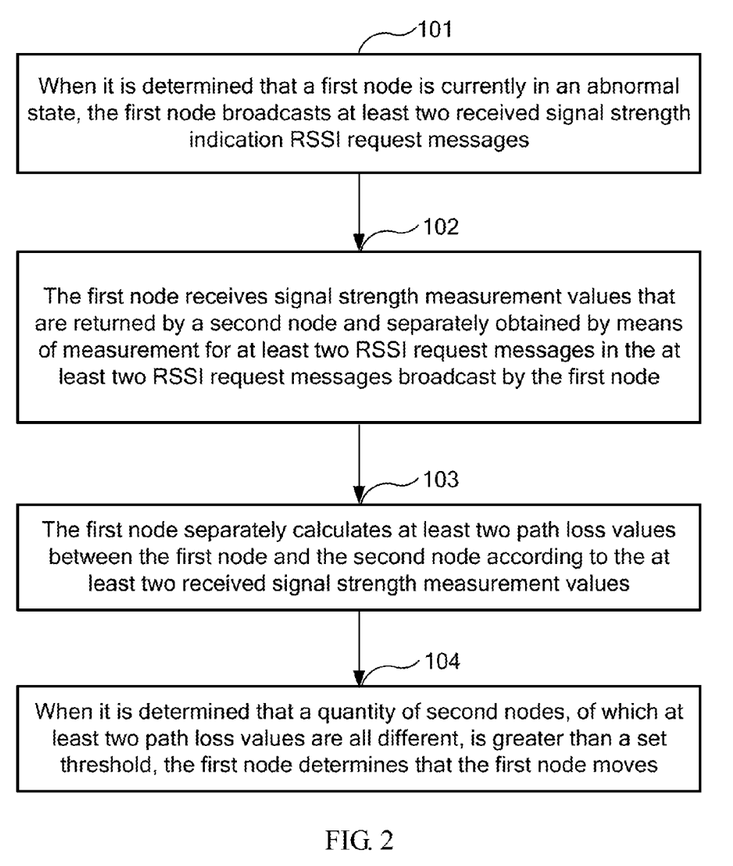
FIG. 2 is a flowchart of a method for determining a node movement according to Embodiment 1.

FIG. 2 is a flowchart of a method for determining a node movement according to Embodiment 1. The method includes the following steps.

Step 101: When it is determined that a first node is currently in an abnormal state, the first node broadcasts at least two received signal strength indication RSSI request messages.

The RSSI (Received Signal Strength Indication) request message is used to instruct a second node that receives the RSSI request message to measure signal strength of the RSSI request message and return a measurement result.

In step 101, in an IPv6 wireless sensor network, an acyclic graph topology network is constructed by using an RPL routing mechanism, and the first node is any node in the acyclic graph topology network. To make each node in the acyclic graph topology network maintain connectivity, the first node periodically sends a DIS message to an neighboring node (or the second node) of the first node, periodically receives a DIO message returned by the neighboring node (or the second node) of the first node, and records a time duration value for receiving a DIO message returned by the another neighboring node (or the second node) of the first node at each time, for example, 5 s.

When there is a greater difference between time duration values that are recorded by the first node and are for receiving a DIO message returned by the another neighboring node of the first node for two consecutive times (for example, if the first node records that a time duration value for receiving a DIO message returned by the another neighboring node of the first node at a time is 5 s, and a time duration value for receiving a DIO message returned by the another neighboring node of the first node at a succeeding time is 15 s, it is considered that there is a greater difference between the time duration values for receiving the DIO messages returned by the another neighboring node of the first node for two consecutive times), it is determined that the first node is in an unstable environment and is likely to become abnormal.

Specifically, manners in which the first node determines that the first node is currently in the abnormal state includes but are not limited to the following.

Manner 1.

When it is detected that a current Rank value changes, the first node determines that the first node is currently in the abnormal state.

Specifically, the first node detects a Rank value of a current signal arriving at a convergence node of the acyclic graph topology network, compares the detected current Rank value with a previously detected Rank value that is locally stored, and determines whether the detected current Rank value is the same as the previously detected Rank value that is locally stored. When it is determined that the detected current Rank value is different from the previously detected Rank value that is locally stored, the first node determines that the first node is currently in the abnormal state.

A Rank value represents a quantity of hops of a signal between the first node and the convergence node. Therefore, when the detected Rank value changes, it may indicate that the first node may be currently in the abnormal state, that is, access to the acyclic graph topology network is in an abnormal state. It needs to be further determined whether a location has changed.

Manner 2.

When it is detected that a parent node set of the first node changes, the first node determines that the first node is currently in the abnormal state.

It should be noted that the parent node set of the first node refers to a set of all nodes that are in the acyclic graph topology network and are adjacent to the first node, or a set of all nodes, where duration of signal transmission is one hop between the nodes and the first node.

Specifically, within a period after the first node sends a DIS message to other adjacent nodes of the first node, the first node determines a quantity of received DIO messages returned by the other nodes. When the quantity of DIO messages currently received by the first node and returned by the other nodes is less than a quantity of DIO messages received at a previous time and returned by the other nodes, it is determined that a quantity of parent nodes in the parent node set of the first node decreases. When the quantity of DIO messages currently received by the first node and returned by the other nodes is greater than the quantity of DIO messages received at the previous time and returned by the other nodes, it is determined that the quantity of parent nodes in the parent node set of the first node increases.

That is, when the first node determines that a change of the parent node set of the first node is detected, it indicates that the first node may be currently in the abnormal state, that is, access to the acyclic graph topology network is in an abnormal state. It needs to be further determined whether a location has changed.

Manner 3.

When it is detected that a preferred parent node of the first node changes, the first node determines that the first node is currently in an abnormal state.

Specifically, a node in the IPv6 wireless sensor network maintains RPL routing topology connectivity, and once the preferred parent node of the first node changes, the first node needs to adjust the preferred parent node. Therefore, after the first node sends a DIS message to the preferred parent node of the first node, if a DIO message returned by the preferred parent node is not received within a set period of time or is received after a set period of time, it is determined that the preferred parent node changes, which indicates that the first node may be currently in the abnormal state. That is, access to the acyclic graph topology network is in an abnormal state. It needs to be further determined whether a location has changed.

It should be noted that the manners in which the first node determines that the first node is currently in the abnormal state include at least one of the foregoing manners, which is not additionally limited herein.

When it is determined that the first node is currently in the abnormal state, the first node broadcasts the at least two received signal strength indication RSSI request messages.

Alternatively, when it is determined that the first node is currently in the abnormal state, the first node broadcast a received signal strength indication RSSI request message for at least two times.

Optionally, the RSSI request message broadcast each time/each broadcast RSSI request message carries a transmit power value of a broadcast RSSI. That the RSSI request message carries the transmit power value of the RSSI request message, on the one hand, enables a second node that receives the RSSI request message to calculate a path loss value between the first node and the second node, and on the other hand, enables the second node that receives the RSSI request message to determine whether the at least two RSSI request messages broadcast by the first node are a same RSSI request message.

It should be noted that transmit power of RSSIs carried in the at least two broadcast RSSI request messages, or in the RSSI request message broadcast for at least two times may be the same or may be different.

The first node may broadcast an RSSI request message periodically, or at a scheduled time, or at an interval of set duration. A broadcast time is not further limited herein.

The first node broadcasts the at least two received signal strength indication RSSI request messages, where the RSSI request message is used to instruct the second node that receives the RSSI request message to measure the signal strength of the broadcast RSSI request message that is received, and return the measurement result to the first node.

Optionally, transmit power of an RSSI request message broadcast by the first node supports only receiving by a neighboring node that is at a distance of one hop from the first node. That is, a distance between the first node and a neighboring node that can receive the RSSI request message is one hop. In this way, it can be more accurately determined whether the first node moves.

Step 102: The first node receives signal strength measurement values that are returned by a second node and separately obtained by means of measurement for at least two RSSI request messages in the at least two RSSI request messages broadcast by the first node.

In step 102, because the first node may move in a process of broadcasting the RSSI request message, a quantity of RSSI request messages that are broadcast by the first node and received by a same second node may not be the same as a quantity of RSSI request messages broadcast by the first node. Therefore, the second node measures an RSSI request message that is broadcast by the first node and can be received, and returns a signal strength value that is obtained by means of measurement and is of the RSSI request message to the first node.

For example, when the first node broadcasts RSSI request messages, some nodes can receive all RSSI request messages broadcast by the first node, but some nodes can receive only some of the RSSI request messages broadcast by the first node, which is associated with whether the first node moves.

It is assumed that the first node broadcasts an RSSI request message 1 within a first period, broadcasts an RSSI request message 2 within a second period, and broadcasts an RSSI request message 3 within a third period. When the RSSI request message 1 is broadcast within the first period, a second node that can receive the RSSI request message 1 measures the received RSSI request message 1 and returns a signal strength measurement value 1 obtained by means of measurement to the first node.

When the RSSI request message 2 is broadcast within the second period, a second node that can receive the RSSI request message 2 measures the received RSSI request message 2 and returns a signal strength measurement value 2 obtained by means of measurement to the first node.

When the RSSI request message 3 is broadcast within the third period, a second node that can receive the RSSI request message 3 measures the received RSSI request message 3 and returns a signal strength measurement value 3 obtained by means of measurement to the first node.

For example, second nodes that can receive the RSSI request message 1 include: a node A1, a node A2, a node A3, and a node A4; the node A1 measures the received RSSI request message 1, and obtains a signal strength measurement value a11; the node A2 measures the received RSSI request message 1, and obtains a signal strength measurement value a21; the node A3 measures the received RSSI request message 1, and obtains a signal strength measurement value a31; the node A4 measures the received RSSI request message 1, and obtains a signal strength measurement value a41.

Second nodes that can receive the RSSI request message 2 include: the node A2, the node A3, the node A4, and a node A5; the node A2 measures the received RSSI request message 2, and obtains a signal strength measurement value a22; the node A3 measures the received RSSI request message 2, and obtains a signal strength measurement value a32; the node A4 measures the received RSSI request message 2, and obtains a signal strength measurement value a42; the node A5 measures the received RSSI request message 2, and obtains a signal strength measurement value a52.

Second nodes that can receive the RSSI request message 3 include: the node A1, the node A2, the node A3, and the node A5; the node A1 measures the received RSSI request message 3, and obtains a signal strength measurement value a13; the node A2 measures the received RSSI request message 3, and obtains a signal strength measurement value a23; the node A3 measures the received RSSI request message 3, and obtains a signal strength measurement value a33; the node A5 measures the received RSSI request message 3, and obtains a signal strength measurement value a53.

The signal strength measurement values that are received by the first node, returned by the second node, and separately obtained by means of measurement for the RSSI request messages in the at least two RSSI request messages broadcast by the first node are the signal strength measurement values returned by the second nodes and received by the first node after the first node broadcasts the three RSSI request messages, as shown in Table 1.

It can be seen from Table 1 that the second node A5 does not receive the RSSI request message 1; the second node A1 does not receive the RSSI request message 2; the second node A4 does not receive the RSSI request message 3.

To evaluate a pass loss between the first node and the second node, the second node needs to receive at least two RSSI request messages broadcast by the first node and separately measure the received at least two RSSI request messages to obtain a signal strength measurement value for each RSSI request message.

Step 103: The first node separately calculates at least two path loss values between the first node and the second node according to the at least two received signal strength measurement values.

In step 103, the first node separately calculates the at least two path loss values between the first node and the second node according to the at least two received signal strength measurement values returned by the second node.

The path loss value is equal to a difference between a transmit power value of a signal and a signal strength measurement value of the received signal.

Specifically, one path loss value between the first node and the second node is calculated according to any signal strength measurement value in the at least two received signal strength measurement values and based on the signal strength measurement value and a transmit power value of an RSSI request message corresponding to the signal strength measurement value.

Data in the foregoing table is still used as an example. It is assumed that the first node receives the signal strength measurement values a11 and a13 returned by the second node A1. The first node determines, according to the received signal strength measurement value a11, that a broadcast request message corresponding to the signal strength measurement value a11 is the RSSI request message 1 and acquires a transmit power value b1 of the broadcast RSSI request message 1. Then, one path loss value, obtained by means of calculation, between the first node and the second node A1 is a difference of b1-a11.

The first node determines, according to the received signal strength measurement value a13, that a broadcast request message corresponding to the signal strength measurement value a13 is the RSSI request message 3 and acquires a transmit power value b3 of the broadcast RSSI request message 3. Then, another path loss value, obtained by means of calculation, between the first node and the second node A1 is a difference of b3-a13.

It is assumed that the first node receives the signal strength measurement values a21, a22, and a23 returned by the second node A2. The first node determines, according to the received signal strength measurement value a21, that a broadcast request message corresponding to the signal strength measurement value a21 is the RSSI request mes-

TABLE 1

| Broadcast RSSI request message | Received signal strength measurement value returned by the second node A1 | Received signal strength measurement value returned by the second node A2 | Received signal strength measurement value returned by the second node A3 | Received signal strength measurement value returned by the second node A4 | Received signal strength measurement value returned by the second node A5 |
| --- | --- | --- | --- | --- | --- |
| RSSI request message 1 | a11 | a21 | a31 | a41 | |
| RSSI request message 2 | | a22 | a32 | a42 | a52 |
| RSSI request message 3 | a13 | a23 | a33 | | a53 | sage 1 and acquires the transmit power value b1 of the broadcast RSSI request message 1. Then, one path loss value, obtained by means of calculation, between the first node and the second node A2 is a difference of b1-a21.

The first node determines, according to the received signal strength measurement value a22, that a broadcast request message corresponding to the signal strength measurement value a22 is the RSSI request message 2 and acquires a transmit power value b2 of the broadcast RSSI request message 2. Then, another path loss value, obtained by means of calculation, between the first node and the second node A1 is a difference of b2-a22.

The first node determines, according to the received signal strength measurement value a23, that a broadcast request message corresponding to the signal strength measurement value a23 is the RSSI request message 3 and acquires the transmit power value b3 of the broadcast RSSI request message 3. Then, another path loss value, obtained by means of calculation, between the first node and the second node A1 is a difference of b3-a23.

Step 104: When it is determined that a quantity of second nodes, of which at least two path loss values are all different, is greater than a set threshold, the first node determines that the first node moves.

In step 104, for any second node that returns a signal strength measurement value, the first node calculates a path loss value between the first node and each second node by using the manner described in step 103, and performs the following operations for each second node: comparing, by the first node, any two path loss values in at least two path loss values obtained by means of calculation for the second node, and determining whether the any two path loss values obtained by means of calculation are the same; when a result of the comparing is that the at least two path loss values between the first node and the second node are all different, determining that the second node is an unstable node for the first node; and when a quantity of second nodes that are unstable nodes for the first node is greater than the set threshold, determining that the first node moves; or determining, by the first node, whether any two path loss values in at least two path loss values obtained by means of calculation for a second node are the same, and determining a quantity of second nodes of which the at least two path loss values are all different; calculating, by the first node, a ratio of the quantity of second nodes of which the at least two path loss values are all different to a total quantity of second nodes that return signal strength measurement values; and when the ratio obtained by means of calculation is greater than a set threshold, determining that the first node moves.

According to the solutions in Embodiment 1, when it is determined that a first node is currently in an abnormal state, the first node broadcasts at least two RSSI request messages, receives signal strength measurement values that are returned by a second node and separately obtained by means of measurement for at least two RSSI request messages in the at least two RSSI request messages broadcast by the first node, separately calculates at least two path loss values between the first node and the second node according to the at least two received signal strength measurement values, and when it is determined that a quantity of second nodes, of which at least two path loss values are all different, is greater than a set threshold, determines that the first node moves.

In this way, that a node becomes abnormal is no longer the only condition for determining that the node moves. Instead, when the node detects that the node is in an abnormal state, it is further determined quality of a signal for communication between the node and an adjacent node of the node. Whether the node actually moves can be accurately determined in a timely manner by using a change in the quality of a signal for communication between the node and the adjacent node of the node. Therefore, accuracy of determining a node movement is improved.

Embodiment 2

Figure 3:
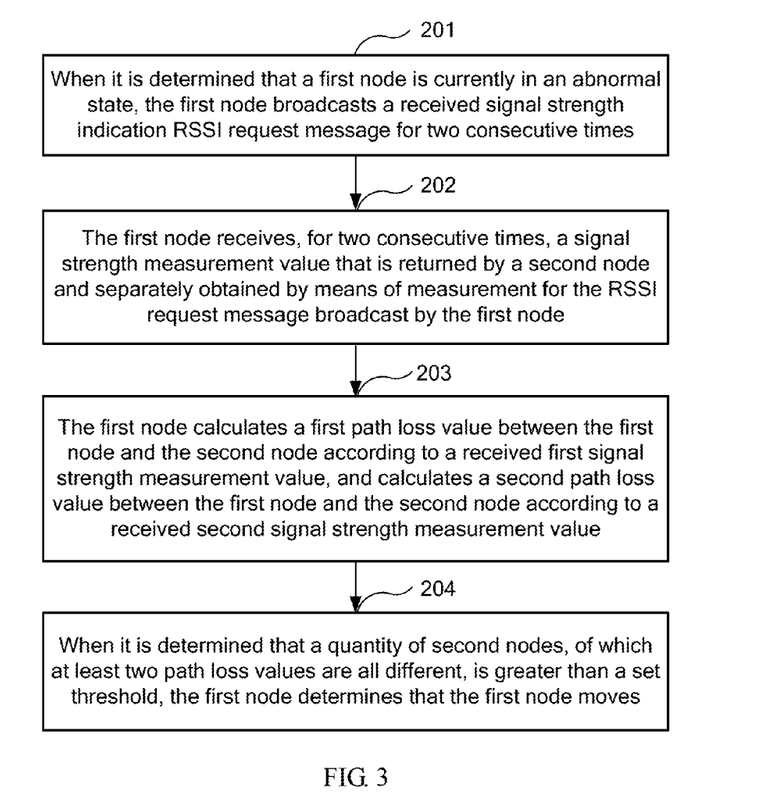
FIG. 3 is a schematic flowchart of a method for determining a node movement according to Embodiment 2.

FIG. 3 is a schematic flowchart of a method for determining a node movement according to Embodiment 2. Embodiment 2 and Embodiment 1 are invented based on a same idea. The method includes the following steps.

Step 201: When it is determined that a first node is currently in an abnormal state, the first node broadcasts a received signal strength indication RSSI request message for two consecutive times.

The RSSI request message broadcast each time is used to instruct a second node that receives the RSSI request message to measure signal strength of the RSSI request message and return a measurement result.

In step 201, in an IPv6 wireless sensor network, an acyclic graph topology network is constructed by using an RPL routing mechanism, and the first node is any node in the acyclic graph topology network. To make each node in the acyclic graph topology network maintain connectivity, the first node periodically sends a DIS message to another neighboring node (or the second node) of the first node, periodically receives a DIO message returned by the another neighboring node (or the second node) of the first node, and records a time duration value for receiving a DIO message returned by the another neighboring node (or the second node) of the first node at each time, for example, 5 s.

When there is a greater difference between time duration values that are recorded by the first node and are for receiving, a DIO message returned by the another neighboring node of the first node for two consecutive times, it is determined that the first node is in an unstable environment and is likely to become abnormal.

Specifically, Manners in which the first node determines that the first node is currently in the abnormal state include but are not limited to the following.

Manner 1.

When it is detected that a current Rank value changes, the first node determines that the first node is currently in the abnormal state.

Specifically, the first node detects a Rank value of a current signal arriving at a convergence node of the acyclic graph topology network, compares the detected current Rank value with a previously detected Rank value that is locally stored, and determines whether the detected current Rank value is the same as the previously detected Rank value that is locally stored. When it is determined that the detected current Rank value is different from the previously detected Rank value that is locally stored, the first node determines that the first node is currently in the abnormal state.

A Rank value represents a quantity of hops of a signal between the first node and the convergence node. Therefore, when the detected Rank value changes, it may indicate that the first node is currently in the abnormal state, that is, access to the acyclic graph topology network is in an abnormal state. It needs to be further determined whether a location has changed.

Manner 2.

When it is detected that a parent node set of the first node changes, the first node determines that the first node is currently in the abnormal state.

It should be noted that the parent node set of the first node refers to a set of all nodes that are in the acyclic graph topology network and are adjacent to the first node, or a set of all nodes, where duration of signal transmission is one hop between the nodes and the first node.

Specifically, within a period after the first node sends a DIS message to other adjacent nodes of the first node, the first node determines a quantity of received DIO messages returned by the other nodes. When the quantity of DIO messages currently received by the first node and returned by the other nodes is less than a quantity of DIO messages received at a previous time and returned by the other nodes, it is determined that a quantity of parent nodes in the parent node set of the first node decreases. When the quantity of DIO messages currently received by the first node and returned by the other nodes is greater than the quantity of DIO messages received at the previous time and returned by the other nodes, it is determined that the quantity of parent nodes in the parent node set of the first node increases.

Manner 3.

When it is detected that a preferred parent node of the first node changes, the first node determines that the first node is currently in the abnormal state.

Specifically, a node in the IPv6 wireless sensor network maintains RPL routing topology connectivity, and once the preferred parent node of the first node changes, the first node needs to adjust the preferred parent node. Therefore, after the first node sends a DIS message to the preferred parent node of the first node, if a DIO message returned by the preferred parent node is not received within a set period of time, it is determined that the preferred parent node changes, and it is further determined that the first node is currently in the abnormal state.

It should be noted that the manners in which the first node determines that the first node is currently in the abnormal state include at least one of the foregoing manners, which is not additionally limited herein.

When it is determined that the first node is currently in the abnormal state, the first node consecutively broadcasts a first reference signal and a second reference signal.

It should be noted that the consecutive broadcasting may be broadcasting for two times in a short time or may be periodic broadcasting for two times, which is not limited herein.

Step 202: The first node receives, for two consecutive times, a signal strength measurement value that is returned by a second node and separately obtained by means of measurement for the RSSI request message broadcast by the first node.

In step 202, the second node receives an RSSI request message broadcast by the first node for a first time, measures the received RSSI request message, and obtains a first signal strength measurement value; the second node receives an RSSI request message broadcast by the first node for a second time, measures the received RSSI request message, and obtains a second signal strength measurement value; and the second node sends the first signal strength measurement value and the second signal strength measurement value that are obtained by means of measurement to the first node.

Step 203: The first node calculates a first path loss value between the first node and the second node according to a received first signal strength measurement value, and calculates a second path loss value between the first node and the second node according to a received second signal strength measurement value.

The path loss value is equal to a difference between a transmit power value of a signal and a signal strength measurement value of the received signal.

The first node determines, according to the received first signal strength measurement value, a first transmit power value of the broadcast RSSI request message corresponding to the first signal strength measurement value. A first path loss value, obtained by means of calculation, between the first node and a second node A1 is a difference between the first transmit power value and the first signal strength measurement value.

The first node determines, according to the received second signal strength measurement value, a second transmit power value of the broadcast RSSI request message corresponding to the second signal strength measurement value. A second path loss value, obtained by means of calculation, between the first node and the second node A1 is a difference between the second transmit power value and the second signal strength measurement value.

In addition, the first node receives signal strength measurement values that are returned by multiple other second nodes and separately obtained by means of measurement for at least two RSSI request messages in at least two RSSI request messages broadcast by the first node, and separately calculates at least two path loss values between the first node and the second node according to the at least two received signal strength measurement values.

Step 204: When it is determined that a quantity of second nodes, of which at least two path loss values are all different, is greater than a set threshold, the first node determines that the first node moves.

In step 204, after obtaining the first path loss value and the second path loss value that are between the first node and the second node, the first node compares the first path loss value and the second path loss value and determines whether they are the same. When the first path loss value is different from the second path loss value, the first node determines that the first node is in an unstable state relative to the second node.

That is, for any second node that returns a signal strength measurement value, the first node calculates a path loss value between the first node and each second node by using the manner described in step 203, and performs the following operations for each second node: comparing, by the first node, any two path loss values in at least two path loss values obtained by means of calculation for the second node, and determining whether the any two path loss values obtained by means of calculation are the same; when a result of the comparing is that the at least two path loss values between the first node and the second node are all different, determining that the second node is an unstable node for the first node; and when a quantity of second nodes that are unstable nodes for the first node is greater than the set threshold, determining that the first node moves; or determining, by the first node, whether any two path loss values in at least two path loss values obtained by means of calculation for a second node are the same, and determining a quantity of second nodes of which the at least two path loss values are all different; calculating, by the first node, a ratio of the quantity of second nodes of which the at least two path loss values are all different to a total quantity of second nodes that return signal strength measurement values; and when the ratio obtained by means of calculation is greater than a set threshold, determining that the first node moves.

According to the solutions in Embodiment 2, when it is determined that a first node is currently in an abnormal state, the first node broadcasts an RSSI request message for two consecutive (or successive) times, receives signal strength measurement values that are returned by a second node and separately obtained by means of measurement for the RSSI request message broadcast by the first node for two times, separately calculates two path loss values between the first node and the second node according to the two received signal strength measurement values, and when it is determined that a quantity of second nodes, of which two path loss values are both different, is greater than a set threshold, determines that the first node moves.

In this way, that a node becomes abnormal is no longer the only condition for determining that the node moves. Instead, when the node detects that the node is in an abnormal state, it is further determined quality of a signal for communication between the node and an adjacent node of the node. Whether the node actually moves can be accurately determined in a timely manner based on a principle that a change in a location of the node causes a change in the quality of a signal for communication. Therefore, accuracy of determining a node movement is improved.

Embodiment 3

Figure 4:
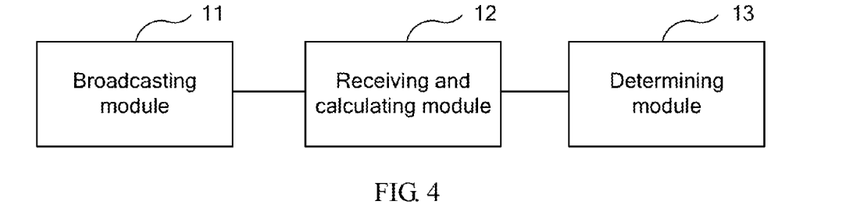
FIG. 4 is a schematic structural diagram of a device for determining a node movement according to Embodiment 3.

FIG. 4 is a schematic structural diagram of a device for determining a node movement according to Embodiment 3. Embodiment 3, Embodiment 2, and Embodiment 1 are invented based on a same idea. The device includes: a broadcasting module 11, a receiving and calculating module 12, and a determining module 13.

The broadcasting module 11 is configured to: when it is determined that the device for determining a node movement is currently in an abnormal state, broadcast at least two received signal strength indication RSSI request messages.

The receiving and calculating module 12 is configured to: receive signal strength measurement values that are returned by a second node and separately obtained by means of measurement for at least two RSSI request messages in the at least two RSSI request messages broadcast by broadcasting module; and separately calculate at least two path loss values between a first node and the second node according to the at least two received signal strength measurement values.

The determining module 13 is configured to: when it is determined that a quantity of second nodes, of which at least two path loss values that are obtained by the receiving and calculating module are all different, is greater than a set threshold, determine that the first node moves.

Optionally, the broadcasting module 11 is specifically configured to successively broadcast an RSSI request message for at least two times, where the RSSI request message is used to instruct a second node that receives the RSSI request message to measure signal strength of the RSSI request message and return a measurement result.

Optionally, the receiving and calculating module 12 is specifically configured to calculate one path loss value between the first node and the second node according to any signal strength measurement value in the at least two received signal strength measurement values and based on the signal strength measurement value and a transmit power value of an RSSI request message corresponding to the signal strength measurement value.

Optionally, the determining module 13 is specifically configured to: calculate a ratio of the quantity of second nodes of which at least two path loss values are all different to a total quantity of second nodes that return signal strength measurement values; and when the ratio obtained by means of calculation is greater than a set threshold, determine that the first node moves.

Optionally, the broadcasting module 11 is specifically configured to: when it is detected that a current Rank value changes, determine that the device is currently in the abnormal state; or when it is detected that a parent node set of the device changes, determine that the device is currently in the abnormal state; or when it is detected that a preferred parent node of the device changes, determine that the device is currently in the abnormal state.

It should be noted that the device for determining whether a node moves in Embodiment 3 may be a logical unit in a node device or may be a physical entity unit in a node device, which is not limited herein.

Embodiment 4

Figure 5:
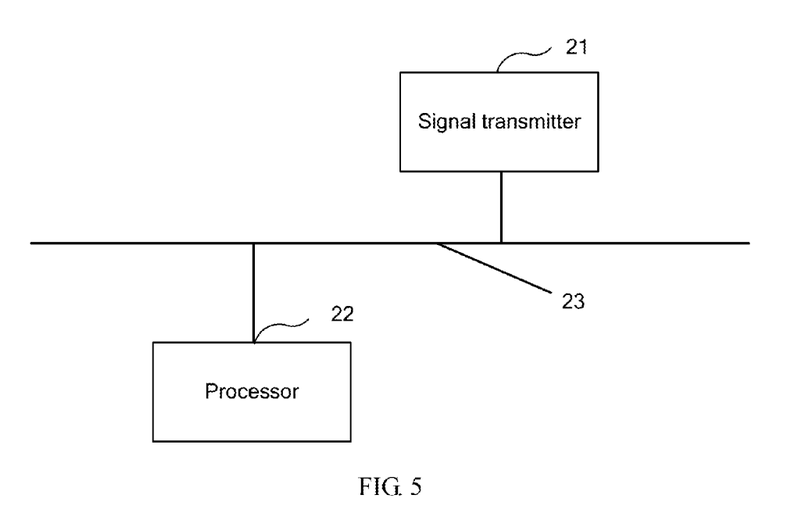
FIG. 5 is a schematic structural diagram of a node device according to Embodiment 4.

FIG. 5 is a schematic structural diagram of a node device according to Embodiment 4. Embodiment 4, Embodiment 1, and Embodiment 2 are invented based on a same idea. The node device includes: a signal transmitter 21 and a processor 22, where the signal transmitter 21 and the processor 22 are connected using a bus 23. Specifically, the signal transmitter 21 is configured to: when it is determined that the node device is currently in an abnormal state, broadcast at least two received signal strength indication RSSI request messages; and the processor 22 is configured to: receive signal strength measurement values that are returned by a second node and separately obtained by means of measurement for at least two RSSI request messages in the at least two RSSI request messages broadcast by a first node; separately calculate at least two path loss values between the first node and the second node according to the at least two received signal strength measurement values; and when it is determined that a quantity of second nodes, of which at least two path loss values are all different, is greater than a set threshold, determine that the first node moves.

Optionally, the signal transmitter 21 is specifically configured to successively broadcast an RSSI request message for at least two times, where the RSSI request message is used to instruct a second node that receives the RSSI request message to measure signal strength of the RSSI request message and return a measurement result.

Optionally, the processor 22 is specifically configured to calculate one path loss value between the first node and the second node according to any signal strength measurement value in the at least two received signal strength measurement values and based on the signal strength measurement value and a transmit power value of an RSSI request message corresponding to the signal strength measurement value.

Optionally, the processor 22 is specifically configured to: calculate a ratio of the quantity of second nodes of which at least two path loss values are all different to a total quantity of second nodes that return signal strength measurement values; and when the ratio obtained by means of calculation is greater than a set threshold, determine that the first node moves.

Optionally, the signal transmitter 21 is specifically configured to: when it is detected that a current Rank value changes, determine that the node device is currently in the abnormal state; or when it is detected that a parent node set of the device changes, determine that the device is currently in the abnormal state; or when it is detected that a preferred parent node of the device changes, determine that the device is currently in the abnormal state.

It should be noted that the node device in Embodiment 4 may be a logical unit in a node device or may be a physical entity unit in a node device, which is not limited herein.

A person skilled in the art should understand that the embodiments may be provided as a method, an apparatus (device), or a computer program product. Therefore, embodiments may use a form of hardware only embodiments, software only embodiments, or embodiments with a combination of software and hardware. Moreover, embodiments may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments have been described, persons skilled in the art can make changes and modifications to these embodiments once they learn the basic inventive concept. Therefore, the following claims are intended to be construed as to cover the described embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
   in response to a first node determining that the first node is currently in an abnormal state, broadcasting, by a transmitter, a plurality of received signal strength indication (RSSI) request messages;
   receiving, by a receiver of the first node, a plurality of signal strength measurement values that are returned by a plurality of second nodes;
   separately calculating, by the first node, a plurality of path loss values between the first node and each of the plurality of second nodes according to signal strength measurement values that are received by the first node from the respective second node of the plurality of second nodes;
   determining, by the first node, a quantity of second nodes for which the plurality of path loss values are each different from each other; and
   determining, by the first node, that the first node moves in response to determining that the quantity of second nodes is greater than a set threshold, wherein determining that the first node moves comprises:
      calculating, by the first node, a ratio of the quantity of second nodes for which the plurality of path loss values are each different from each other to a total quantity of second nodes that for which a signal strength measurement value is received; and
      when the ratio is greater than a set threshold, determining that the first node moves.

2. The method according to claim 1, wherein broadcasting the plurality of RSSI request messages comprises:
   successively broadcasting a single RSSI request message a plurality of times, wherein the RSSI request message instructs each of the plurality of second nodes that receives the RSSI request message to measure signal strength of the received RSSI request message and return a measurement result.

3. The method according to claim 1, wherein separately calculating the plurality of path loss values between the first node and each of the plurality of second nodes according to signal strength measurement values that are received by the first node from the respective second node of the plurality of second nodes comprises:
   calculating one path loss value between the first node and a corresponding second node according to any signal strength measurement value that is received by the first node from the corresponding second node and based on the received signal strength measurement value and a transmit power value of an RSSI request message that corresponds to the signal strength measurement value.

4. The method according to claim 1, wherein the first node determining that the first node is currently in an abnormal state comprises:
   in response to detecting that a preferred parent node of the first node changes, determining that the first node is currently in the abnormal state.

5. The method according to claim 1, wherein the first node determining that the first node is currently in an abnormal state comprises:
   in response to detecting that a current rank value changes, determining that the first node is currently in the abnormal state.

6. The method according to claim 1, wherein the first node determining that the first node is currently in an abnormal state comprises:

in response to determining that a parent node set of the first node changes, determining that the first node is currently in the abnormal state.

7. A node device, comprising:
a signal transmitter, configured to broadcast a plurality of received signal strength indication (RSSI) request messages in response to determining that the node device is in an abnormal state; and
a processor, configured to:
receive signal strength measurement values that are returned by a plurality of second nodes, each of the plurality of second nodes separately obtaining signal strength measurements for each of the plurality of RSSI request messages received by the respective second node;
separately calculate a plurality of path loss values between the node device and each of the plurality of second nodes according to signal strength measurement values that are received from the respective second node of the plurality of second nodes;
determine a quantity of second nodes for which the plurality of path loss values are each different from each other; and
determine that the node device moves in response to determining that the quantity of second nodes is greater than a set threshold, wherein determining that the node device moves comprises:
calculating a ratio of the quantity of second nodes for which the plurality of path loss values are each different from each other to a total quantity of second nodes for which signal strength measurement values are received; and
determining that the node device moves in response to determining that the ratio is greater than a set threshold.

8. The node device according to claim 7, wherein broadcasting the ft plurality of RSSI request messages comprises:
successively broadcasting a single RSSI request message a plurality of times, wherein each RSSI request message instructs a second node of the plurality of second nodes that receives the RSSI request message to measure signal strength of the RSSI request message and return a measurement result.

9. The node device according to claim 7, wherein the processor is further configured to:
calculate one path loss value between the node device and a corresponding second node according to any signal strength measurement value that is received by the node device from the corresponding second node, and based on the signal strength measurement value and a transmit power value of an RSSI request message corresponding to the signal strength measurement value.

10. The node device according to claim 7, wherein the signal transmitter is further configured to:
in response to detecting that a current rank value changes, determine that the node device is currently in the abnormal state.

11. The node device according to claim 7, wherein the signal transmitter is further configured to:

in response to detecting that a parent node set of the node device changes, determine that the node device is currently in the abnormal state.

12. The node device according to claim 7, wherein the signal transmitter is further configured to:
in response to detecting that a preferred parent node of the node device changes, determine that the node device is currently in the abnormal state.

13. A node device, comprising:
means for broadcasting a plurality of received signal strength indication (RSSI) request messages in response to determining that the node device is in an abnormal state;
means for receiving signal strength measurement values that are returned by a plurality of second nodes, each of the plurality of second nodes separately obtaining signal strength measurements for each of the plurality of RSSI request messages received by the respective second node;
means for separately calculating a plurality of path loss values between the node device and each of the plurality of second nodes according to signal strength measurement values that are received from the respective second node of the plurality of second nodes;
means for determining a quantity of second nodes for which the plurality of path loss values are each different from each other; and
means for determining that the node device moves in response to determining that the quantity of second nodes is greater than a set threshold, wherein determining that the node device moves comprises:
calculating, by the node device, a ratio of the quantity of second nodes for which the plurality of path loss values are each different from each other to a total quantity of second nodes for which a signal strength measurement value is received; and
when the ratio is greater than a set threshold, determining that the node device moves.

14. The node device according to claim 13, wherein broadcasting the plurality of RSSI request messages comprises:
successively broadcasting a single RSSI request message a plurality of times, wherein each RSSI request message instructs a second node of the plurality of second nodes that receives the RSSI request message to measure signal strength of the RSSI request message and return a measurement result.

15. The node device according to claim 13, further comprising:
means for calculating one path loss value between the node device and a corresponding second node according to any signal strength measurement value that is received by the node device from the corresponding second node, and based on the signal strength measurement value and a transmit power value of an RSSI request message corresponding to the signal strength measurement value.

* * * * *

UNITED STATES PATENT AND TRADEMARK OFFICE
CERTIFICATE OF CORRECTION

| | | |
|---|---|---|
| PATENT NO. | : 9,603,118 B2 | Page 1 of 1 |
| APPLICATION NO. | : 15/043741 | |
| DATED | : March 21, 2017 | |
| INVENTOR(S) | : Pei Liu | |

It is certified that error appears in the above-identified patent and that said Letters Patent is hereby corrected as shown below:

In the Claims

In Column 19, Line 37, Claim 8, delete "the ft plurality" and insert --the plurality--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*